(12) United States Patent
Mueller et al.

(10) Patent No.: US 6,252,901 B1
(45) Date of Patent: Jun. 26, 2001

(54) DIGITAL MODEM FAST RETRAIN ESCAPE MECHANISM

(75) Inventors: A. Joseph Mueller; Richard G. C. Williams, both of San Diego, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/292,295

(22) Filed: Apr. 15, 1999

Related U.S. Application Data

(60) Provisional application No. 60/090,608, filed on Jun. 23, 1998.

(51) Int. Cl.[7] .................................................. H04B 1/38
(52) U.S. Cl. ...................................... 375/222; 455/557
(58) Field of Search ................................. 375/219, 222, 375/377; 370/276, 277, 278, 282; 455/88, 557

(56) References Cited

U.S. PATENT DOCUMENTS

| | | |
|---|---|---|
| 4,621,366 * 11/1986 | Cain et al. | 375/222 |
| 5,214,637 5/1993 | Sridhar et al. . | |
| 5,228,060 7/1993 | Uchiyama . | |
| 5,787,363 7/1998 | Scott et al. . | |
| 5,852,630 * 12/1999 | Langberg et al. | 375/219 |
| 5,960,036 * 9/1999 | Johnson et al. | 375/219 |
| 5,991,269 * 11/1999 | Williamson et al. | 370/241 |

* cited by examiner

*Primary Examiner*—Young T. Tse
(74) *Attorney, Agent, or Firm*—Fish & Richardson PC

(57) ABSTRACT

A method and system for escaping from a fast retrain sequence in an ADSL system, particularly in a splitterless ADSL system. In one aspect of the invention, in order to minimize the impact of needing to complete nearly all of a fast retrain sequence, particularly when the sequence is unnecessary, the invention allows a responding transceiver unit to reply to a fast retrain request from an initiating transceiver unit with an "initialization" response. This response, not part of any standard ADSL fast retrain protocol, aborts a fast retrain sequence, and permits initialization to commence without the delay caused by waiting for completion of the fast retrain sequence. In another aspect of the invention, a fast retrain sequence is allowed to proceed up to a certain point, and then truncated by sending a command between a responding transceiver unit and an initiating transceiver unit. In particular, whenever initialization and power cut-back are both required (a typical case in ADSL systems), a fast retrain sequence is initiated, acknowledged, and executed until the end of the power cut-back section of the conventional fast retrain sequence, at which time a digital message is exchanged between the initiating transceiver unit and responding transceiver unit indicating the desire to escape from the fast retrain sequence prematurely. Thus, the fast retrain sequence can be truncated to improve performance while still maintaining the benefits of the conventional power cut-back function.

26 Claims, 4 Drawing Sheets

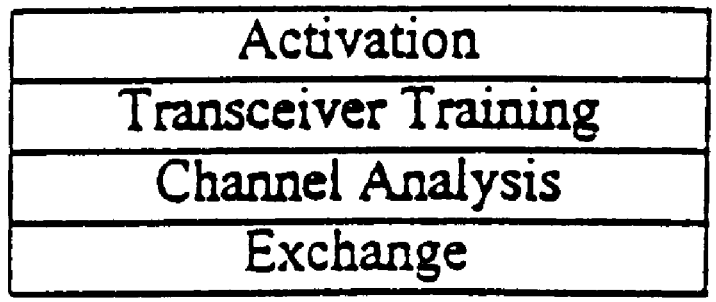
FIG. 2 Initialization Sequence Prior Art
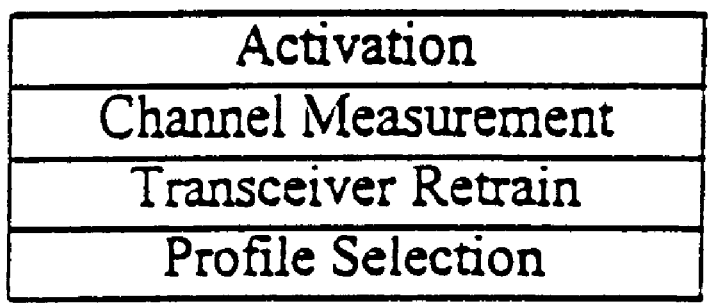
FIG. 3 Fast Retrain Sequence Prior Art

DIGITAL MODEM FAST RETRAIN ESCAPE MECHANISM

This application claims priority under 35 USC §119(e) to U.S. Patent Application Ser. No. 60/090,608, filed Jun. 23, 1998.

TECHNICAL FIELD

This invention relates to electronic communication systems, and more particularly to a system and method for escaping from a fast retrain sequence in a digital modem communication system, such as a digital subscriber line communication system.

BACKGROUND

A significant amount of effort has been undertaken to use existing telephone lines for high speed digital data communications. As part of this effort, a number of Digital Subscriber Line (DSL) systems have been proposed. For example, a version known as Asymmetric Digital Subscriber Line (ADSL) provides a system that applies signals over a single twisted-wire pair that supports "plain old telephone service" (POTS) and high-speed duplex (simultaneous two-way) digital services. Two of the proposed standards for ADSL are set forth in the ANSI T1.413 Issue 2 ADSL Standard (1998), and in the *Universal ADSL Framework Document, Terms of Reference, Implemenation Guide* (Jun. 15, 1998) from the Universal ADSL Working Group, both of which are hereby incorporated by reference. A third ADSL standard, proposed by the ITU, is the G.lite standard, further described in ITU Temporary Document NF-008, *Draft G.lite Recommendation* (May 11, 1998). Both of the proposed G.lite and U-ADSL (Universal ADSL) standards are variants of the T1.413 ADSL standard, with modifications directed primarily to work in a splitterless environment (i.e., without a splitter at the remote user end). A goal is to have both G.lite and U-ADSL merge into an identical (or at least very similar) standard in the future.

A DSL system essentially encodes digital data as analog signals at data rates significantly higher than voice band systems using special digital modems. Each user's link is conducted over twisted-pair conductors bundled with a large number of other twisted-pair conductors, each used at different times and for different purposes (e.g., voice only, data only, and both voice and data). The length and characteristics of wire run from a user's remote transceiver to a central office transceiver may vary greatly from user to user. In addition, the physical channel over which the system communicates varies over time due to, for example, temperature and humidity changes, fluctuating crosstalk interference sources, and, in splitteriess configurations, phones transitioning on-hook and off-hook. Consequently, the analog DSL signals exists in a noisy, time varying environment. Accordingly, DSL systems use sophisticated equalizer training, echo canceller training, and synchronization techniques (collectively, training) to cope with these factors, all of which require retraining from time to time. Additionally, DSL system equipment may go offline at any time, such as when powered down or placed into an idle or sleep mode. Retraining may be necessary or desirable to transition such equipment back online.

FIG. 1 is a block diagram of one embodiment of a prior art DSL system. A user's computer 10 is coupled to a DSL modem 12 through a band splitter 14 to a conventional telephone line 16 and thence to a telephone company (telco) system 18. The telco system 18 includes a DSL modem and necessary equipment to establish a link to, for example, the Internet. The splitter 14 separates voice band frequencies from higher data band frequencies. A conventional telephone 20 may be coupled to the splitter 14 for communication over the voice band frequencies.

FIG. 1 depicts a typical architecture for the T1.413 ADSL standard. The splitter 14 isolates the ADSL system from the effects of user telephone devices. Thus, a T1.413 compliant ADSL system does not require retraining to transition from an off-hook state to an on-hook state, or vise versa. However, for the proposed G.lite and U-ADSL standards, the splitter 14 at the remote end is optional, and the intention of the standards is that the splitter 14 will not be present. Under these latter standards, telephone on-hook/off-hook transitions have an adverse effect on the system and force retraining. Further, a T1.413 compliant ADSL system is "always on". However, G.lite and U-ADSL systems are "always available", and are actually put into low power states between sessions of user activity. "Waking up" from these low power states requires retraining.

At present, splitterless G.lite and U-ADSL DSL modems attempt to recover from a channel disruption or silent period (e.g., caused by an on-hook/off-hook transition or a dropped line) by using a fast retrain sequence. This procedure relies on the storage of profiles comprising stored modem operating parameters for particular line characteristics. During a fast retrain sequence between two transceiver units, if both units have maintained their stored profiles, then each unit's receiver may invoke a stored profile to set the modem characteristics for the far-end unit's transmitter, thereby permitting data transmission (named the "SHOWT1ME" state) to resume rapidly.

FIG. 2 is a diagram of the general timing sequence of an initialization training sequence for two transceiver units of a standard digital modem communication system in accordance with the prior art. One transceiver unit is a central office (C) unit; the other transceiver unit is a remote terminal (R) unit. The timing sequence includes the following steps:

(1) Activation: Either end may initiate a (re)training procedure. For T1.413 and U-ADSL, this involves the use of predefined activation tones which, when received by the far end, indicates a request to go through training and, if training is successful, enter the SHOWTIME state. For G.lite, the full train activation always uses G.hs signaling sessions (G.hs is a standard handshake procedure for initiating xDSL sessions by identifying common modes of operation and selecting and entering an appropriate mode), which can take 2 seconds or longer (but may be as short as about 0.5 seconds).

(2) Transceiver training: This typically includes setting receiver gain control, acquiring timing and training echo cancellers and equalizers.

(3) Channel analysis: The channel is measured to determine data handling capacity (in the form of a bits and gains table). For G.lite, the results of this (i.e., the bits and gains table) may be stored in a profile.

(4) Exchange: Negotiation and exchange of operating parameters as determined through channel analysis is performed (i.e., all the mandatory information typically stored in a profile is exchanged here—bits and gains table, Reed-Solomon coding parameters. data rates, etc.)

FIG. 3 is a diagram of the general timing sequence of a proposed fast retrain sequence for two transceiver units of a standard digital modem communication system in accordance with the prior art. The timing sequence includes the following steps:

(1) Activation: The G.lite fast retrain uses activation tones in a manner similar to T1.413 initialization.

(2) Channel measurement: The channel is measured to (a) ensure that the channel is stable (i.e., any transients due to on or off hook transitions have subsided), (b) determine power cut-back levels, and (c) begin characterizing the channel in order to select the appropriate profile (if one exists). Timing recovery should be performed here as well (the system may either fine-tune the timing if the previous state was the SHOWTIME state or may require timing if previous timing information is not available or no longer valid).

(3) Transceiver Retraining: Echo cancellers and equalizers are trained and timing, may be further tuned. Additional information stored in the profile from a previous session (such as previous equalizer taps) may be used to speed the process. In addition, some channel analysis may be done to assist with final profile selection.

(4) Profile Selection: Exchange of profile numbers. Profile numbers reference the information exchanged in a previous initialization Exchange procedure.

Regardless of whether or not the initiating or responding units can or wish to exchange profiles (e.g. because the profiles have been lost due to a power failure), nearly the entire fast retrain procedure must be completed before commencing the next desired operation (e.g., transition to a G.hs signaling session or performing an initialization training sequence where profiles are not required). Thus, if profiles do not exist, or there is otherwise a lack of information sufficient to return directly to a data transmission state at completion of the fast retraininig (i.e., the SHOWTIME state), or there are other reasons for truncating the fast retrain procedure, the process of completing a fast retrain sequence is futile or unnecessary. Such completion is inefficient and adds about 1.5 seconds or more to the start-up time of a DSL modem. For a system that is supposed to be "always on" or "always available", this time delay can seem significant to consumers.

The inventors have determined that it would be desirable in an ADSL system, and in particular in a splitterless ADSL system, if retraining could be accomplished rapidly to provide better performance. Accordingly, the present invention provides a method and system for improving performance in an ADSL system.

SUMMARY

The present invention provides a method and system for escaping from a fast retrain sequence in an ADSL system, particularly in a splitterless ADSL system.

In one aspect of the invention, in order to minimize the impact of needing to complete nearly all of a fast retrain sequence even when the sequence is futile or unnecessary the invention allows a responding transceiver unit to reply to a fast retrain request from an initiating transceiver unit with an "initialization" response. This response, not part of any standard ADSL fast retrain sequence, aborts a fast retrain sequence, and permits initialization to commence without the delay caused by waiting for completion of the fast retrain sequence.

More particularly, the invention includes a system, method, and computer program for aborting a fast retraining sequence in a digital modem communication system including detecting, in a responding transceiver unit, commencement of a fast retrain sequence from an initiating transceiver unit; and replying to the fast retrain sequence from the responding transceiver unit in response to such determining with a signal sufficient to cause the initiating transceiver unit to abort the fast retrain sequence.

In another aspect of the invention, a fast retrain sequence is allowed to proceed up to a certain point, and then truncated by sending a command between a responding transceiver unit and an initiating transceiver unit. In particular, whenever initialization and power cut-back are both required (a typical case in ADSL systems), a fast retrain sequence is initiated, acknowledged, and executed until the end of the power cut-back section of the conventional fast retrain sequence, at which time dioital messages are exchanged between the initiating transceiver unit and responding transceiver unit indicating the desire to escape from the fast retrain sequence prematurely. Thus, the fast retrain sequence can be truncated to improve performance while still maintaining the benefits of the conventional power cut-back function.

More particularly, the invention includes a system, method, and computer program for trunicatining a fast retraining sequence in a digital modem communication systems including initiating a fast retrain sequence between an initiating transceiver unit and a responding transceiver unit; executing the fast retrain sequence until the end of a power cut-back section of the fast retrain sequence; exchanging a message between the initiating transceiver unit and a responding transceiver units indicating that the fast retrain sequence is to be truncated; and truncating execution of the fast retrain sequence in response to such message.

The invention includes an escape mechanism that in the abort embodiment is definable in terms of standard commands. The invention further includes an escape mechanism that in the truncate embodiment is easily implementable by defining one or more unused bits in an existing standard message as a flag to indicate a truncation operation by a remote terminal, and adding a new message to convey a similar flag value indicating a truncation operation by a central office terminal.

The invention also makes it more desirable for a central office G.lite and/or U-ADSL system to store more than one profile per transceiver port but less than one profile per user in a shared modem pool. Thus, a transceiver unit can write over profiles that have not been used for a while (e.g., using a "least recently used" algorithm) without inquiring the 1.5+ second time penalty of a futile fast retrain sequence for overwritten profiles.

The invention reduces the impact of lost profiles (e.g., due to power outages, erasures, or overwrites), or loss or lack of information sufficient to return directly to a data transmission state at completion of the fast retraining, or decisions to invoke fast retraining to benefit from the power cut-back phase of the conventional fast retrain sequence before performing initialization.

The invention also reduces the overall time required to switch applications because the ADSL system does not have to complete a fast retrain sequence before commencing initialization and/or entering into a G.hs signaling session.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a diagram of the general timing sequence of an initialization training sequence for two transceiver units of a standard digital modem communication system in accordance with the prior art.

FIG. 3 is a diagram of the general timing sequence of a proposed fast retrain sequence for two transceiver units of a standard digital modem communication system in accordance with the prior art.

Like reference numbers and designations in the various drawings indicate like elements.

DETAILED DESCRIPTION

Figure 1:
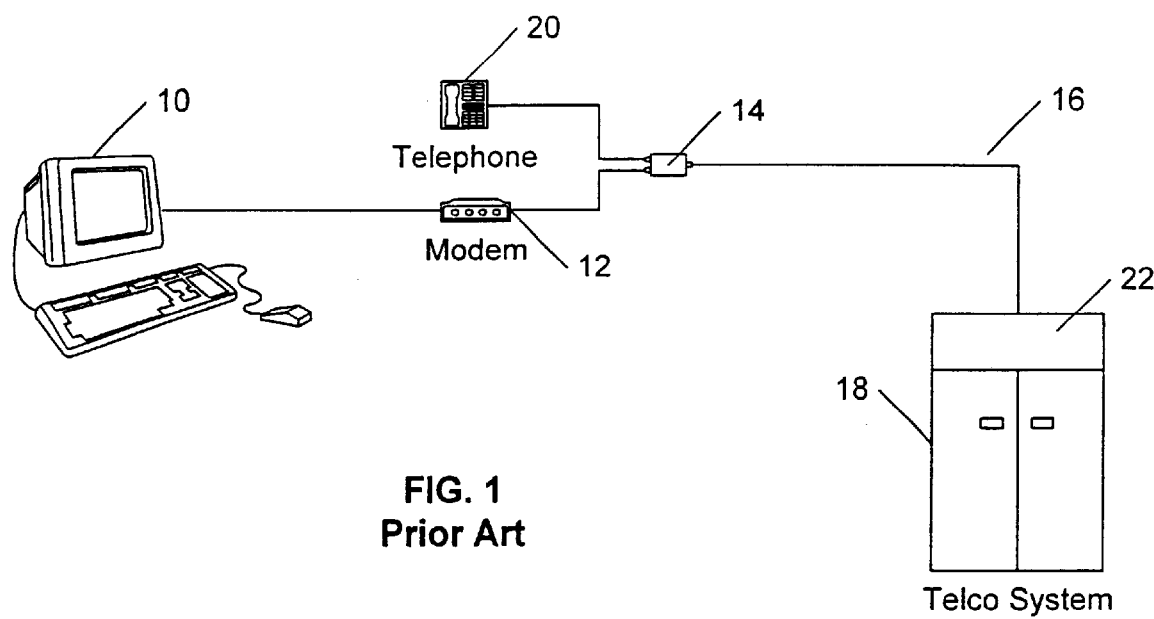
FIG. 1 is a block diagram depicting a typical architecture for a full ADSL standard communication system in accordance with the prior art.

In order to minimize the impact of needing to complete nearly all of a fast retrain sequence even when the sequence is futile, the invention allows a responding transceiver unit to reply to a fast retrain request from an initiating transceiver unit with an "initialization" response. This response, not originally part of any ADSL protocol, aborts a fast retrain sequence, and permits initialization to commence without the delay caused by waiting for completion of the fast retrain sequence.

A fast retrain sequence may be deemed futile or unnecessary because a power failure at either transceiver unit has caused a loss of profiles, or there is a loss or lack of information sufficient to return directly to a data transmission state at completion of the fast retraining for any reason, or because either transceiver has intentionally "erased" some or all of its stored profiles. Such erasure could occur in a shared modem pool configuration, which stores more than one profile per transceiver port but less than one profile per user. Thus, a transceiver unit can write over profiles that have not been used for a while (e.g,., using a "least recently used" algorithm) without incurring the 1.5+ second time penalty of a futile fast retrain sequence for overwritten profiles. Such erasure can also occur because some or all profiles, for whatever reason, are not performing well (e.g., because of slow channel variations, one may wish to purge the existing profiles which are no longer current or optimum).

Fast retraining may also be unnecessary if it is determined that a responding transceiver unit is changing data transmission modes, for example, when a modem wakes up from an idle period and wishes to transition to a different modulation format. Thus for example, a sleeping G.lite modem may wake up into a fast retrain and then abort to a G.hs session. The G.hs session will negotiate entry into, for example, G.dmt, to meet the requirements of a new application.

Fast retraining may also be unnecessary if it is determined that a responding transceiver unit is changing data transmission mode parameters. This is similar to changing data transmission modes, except instead of switching between different modulation formats, the modem would wake up using its original modulation format but would use different operating parameters (such as data rate, error rate, or noise margin requirements).

In another aspect of the invention, a fast retrain sequence is allowed to proceed up to a certain point, and then truncated by sending a command between a responding transceiver unit and an initiating transceiver unit. In particular, in conventional ADSL splitterless systems, an initialization routine does not allow for power cut-back, a generally necessary operation in a splitterless environment to avoid noise spillage from ADSL signals into the voice band due to non-linearities in telephones. Thus, whenever initialization and power cut-back are both required (a typical case), normally the full fast retrain sequence must be invoked first followed by initialization. Thus, even though profiles may be available, the intention would be to not exchange profiles but rather enter into an initialization and/or a G.hs signaling session. Under the present invention, a fast retrain sequence is initiated, acknowledged, and executed until the end of the power cut-back section of the conventional fast retrain sequence, at which time a digital message is exchanged between the initiating transceiver unit and responding transceiver unit indicating the desire to escape from the fast retrain sequence prematurely. Thus, the fast retrain sequence can be truncated to improve performance while still maintaining the benefits of the conventional power cut-back function.

Fast Retrain Sequence Abort

In the fast retrain sequence abort embodiment of the invention, either a central office ADSL transceiver unit (ATU-C) or a remote ADSL transceiver unit (ATU-R) can abort a futile fast retrain sequence. In the preferred embodiment, the fast retrain sequence abort procedure would be as follows for U-ADSL and G.lite implementations:

(1) U-ADSL ATU-C transceiver unit aborts:
  (a) The ATU-R transceiver unit initiates a fast retrain sequence by issuing an R-RECOV signal.
  (b) The ATU-C transceiver unit responds with any one of the conventional C-ACT1, C-ACT2, C-ACT3, C-ACT4 initialization activation signals (generically, a C-ACT signal), instead of the expected C-RECOV reply signal. The C-ACT signal itself is conventional and is already designed to be decoded by ADSL transceiver units, but its appearance in the retrain sequence promptly after a fast retrain request signal is unconventional. The C-ACT signal received instead of the C-RECOV signal would indicate to a suitably programmed transceiver unit that initialization is desired. Both transceiver units would proceed to commence an initialization training sequence immediately rather than wait for the fast retrain sequence to substantially complete.

(2) U-ADSL ATU-R Iransceiver unit aborts:
  (a) The ATU-C transceiver unit initiates a fast retrain sequence by issuing a C-RECOV signal.
  (b) The ATU-R transceiver unit responds with a conventional R-ACT-REQ initialization activation signal instead of the expected R-RECOV reply signal. Again, the R-ACT-REQ signal itself is conventional and is already designed to be decoded by ADSL transceiver units, but its appearance in the retrain sequence promptly after a fast retrain request signal is unconventional. The R-ACT-REQ signal received instead of the R-RECOV signal would indicate to a suitably programmed transceiver unit that initialization is desired. Both transceiver units would proceed to commence an initialization training sequence immediately rather than wait for the fast retrain sequence to substantially complete.

(3) G.lite ATU-C transceiver unit aborts:
  (a) The ATU-R transceiver unit initiates a fast retrain sequence by issuing an R-RECOV signal.
  (b) The ATU-C transceiver unit responds with conventional G.hs signaling instead of the expected C-RECOV reply signal. The G.hs signaling itself is conventional and is already designed to be decoded by ADSL transceiver units, but its appearance in the retrain sequence promptly after a fast retrain request signal is unconventional. Receiving G.hs signaling instead of the C-RECOV signal would indicate to a suitably programmed transceiver unit that initialization is desired. Both transceiver units would proceed to commence an initialization training sequence immediately rather than wait for the fast retrain sequence to substantially complete.

(4) G.lite ATU-R transceiver unit aborts:
(a) The ATU-C transceiver unit initiates a fast retrain sequence by issuing a C-RECOV signal.
(b) The ATU-R transceiver unit responds with conventional G.hs signaling instead of the expected R-RECOV reply signal. Again, the G.hs signaling itself is conventional and is already designed to be decoded by ADSL transceiver units, but its appearance in the retrain sequence promptly after a fast retrain request signal is unconventional. Receiving G.hs signaling instead of the R-RECOV signal would indicate to a suitably programmed transceiver unit that initialization is desired. Both transceiver units would proceed to commence an initialization training sequence immediately rather than wait for the fast retrain sequence to substantially complete.

These four specific embodiments may be summarized as follows: in response to a fast retrain request from a transceiver unit, a responding transceiver unit responds with an initialization activation signal (U-ADSL) or G.hs signaling (G.lite) out of conventional order.

Figure 4:
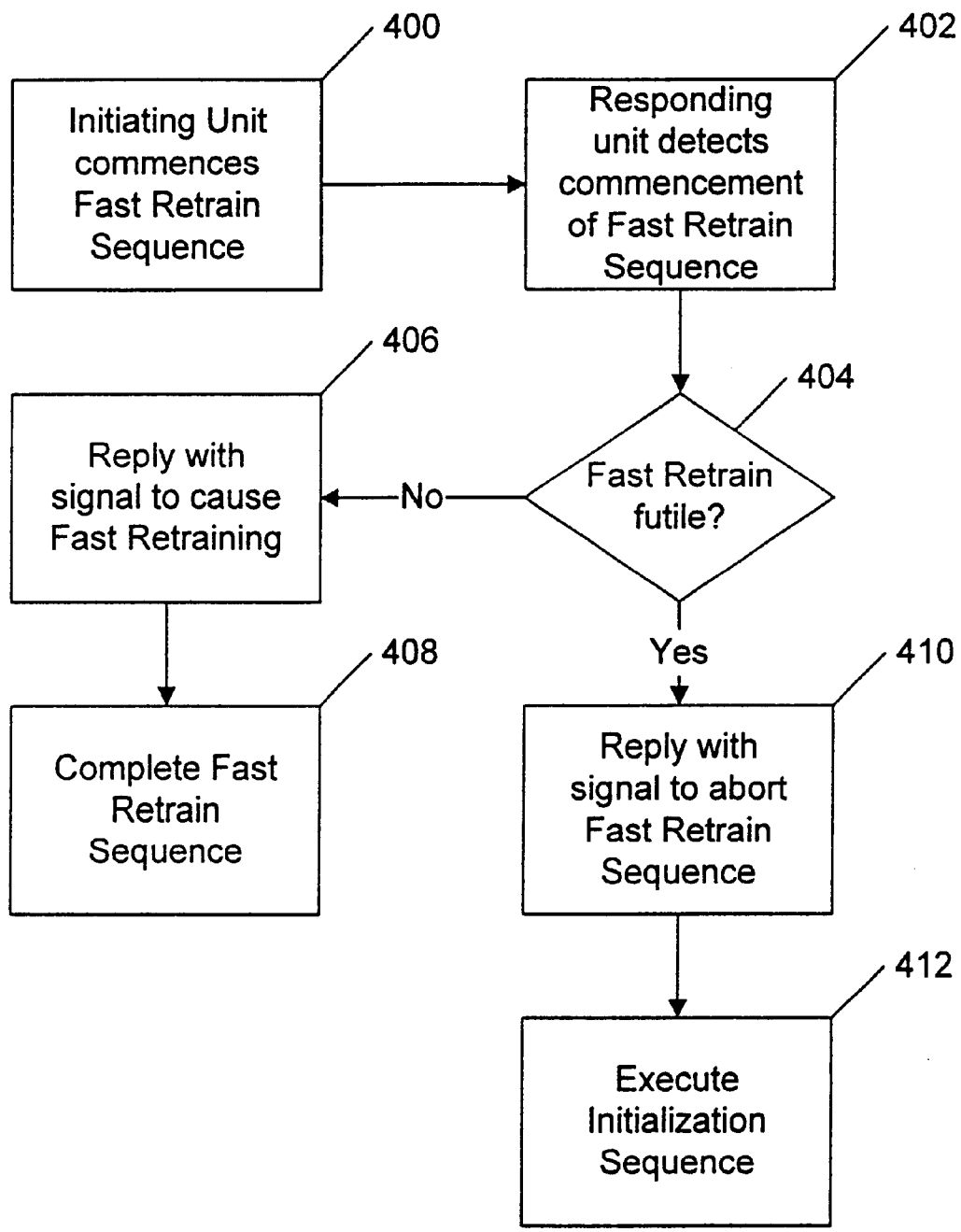
FIG. 4 is a flowchart showing a general embodiment of the fast retrain sequence abort embodiment of the invention.

FIG. 4 is a flowchart showing a general embodiment of the invention for aborting a fast retraining sequence in a digital modem communication system. An initiating transceiver unit commences transmission of a fast retrain sequence to a responding transceiver unit (STEP 400). The responding transceiver unit detects the commencement of the fast retrain sequence, in conventional fashion (STEP 402). The responding transceiver unit then makes a determination as to whether completion of the fast retrain sequence would be futile (for example, by determining that no stored profiles corresponding to the initiating transceiver unit are stored in the responding transceiver unit) (STEP 404). If the fast retrain sequence would not be futile, then the responding transceiver unit responds in convention fashion to the initiating transceiver unit with an expected reply signal (STEP 406), and the fast retrain sequence proceeds in conventional fashion (STEP 408). However, if the fast retrain sequence would be futile, then the responding transceiver unit replies to the initiating transceiver unit with a signal sufficient to cause the initiating transceiver unit to abort the fast retrain sequence, in order to commence an initialization training sequence (STEP 410). Thereafter. the initialization training sequence proceeds in conventional fashion (STEP 412).

Fast Retrain Sequence Truncate

In the fast retrain sequence truncate embodiment of the invention, either the ATU-C transceiver unit or the ATU-R transceiver unit can truncate a futile fast retrain sequence. In the preferred embodiment, the fast retrain sequence truncate procedure would be as follows for a G.lite or U-ADSL implementation:

(1) A fast retrain sequence is initiated, acknowledged, and begins execution.
(2) At the end of the power cut-back section of the fast retrain sequence, a message is exchanged between the ATU-C and ATU-R transceiver units.
(3) In the preferred embodiment, this message contains a flag comprising one bit which is used to identify whether the fast retrain sequence is to proceed to completion or whether both transceiver units should exit the fast retrain sequence and, in the case of G.lite, transition to a G.hs signaling session or, in the case of U-ADSL, transition directly to initialization. The transceiver units operate in accordance with the flag value.

In the preferred embodiment, the message used by an ATU-R transceiver unit is a standard "R-MSG-FR1" message. This is a 16-bit message and follows the channel measurement phase of the fast retrain sequence. Bit d5 (bit 5 of the least significant byte of the 16-bit or 2-byte message) is set to indicate "fast retrain truncate". The preferred message used by the ATU-C transceiver unit is named "C-MSG-FR1". This is defined as part of the invention to be a 16-bit message that follows the channel measurement phase of the fast retrain sequence and reception of an R-MSG-FR1 message. The invention defines bit b5 of the 16-bit message (this message is not segmented into bytes as is the case for the ATU-R transceiver unit) to be set to indicate "fast retrain truncate". Of course, other messages and message bits could be devised if desired.

If one or both transmitters set the fast retrain truncate bit, the truncate shall occur. In the illustrated embodiment, the fast retrain sequence implies that the ATU-R transceiver unit sends the truncate message first, followed by the ATU-C transceiver unit. If the ATU-R transceiver unit sets the fast retrain truncate bit, then the ATU-C transceiver unit fast retrain truncate bit can be ignored because the system will truncate anyway. Logical criteria for initiating truncation includes lack of stored profiles or a need or desire to proceed with initialization or enter a G.hs signaling session. Generally, the criteria for truncation will be implementation specific.

Figure 5:
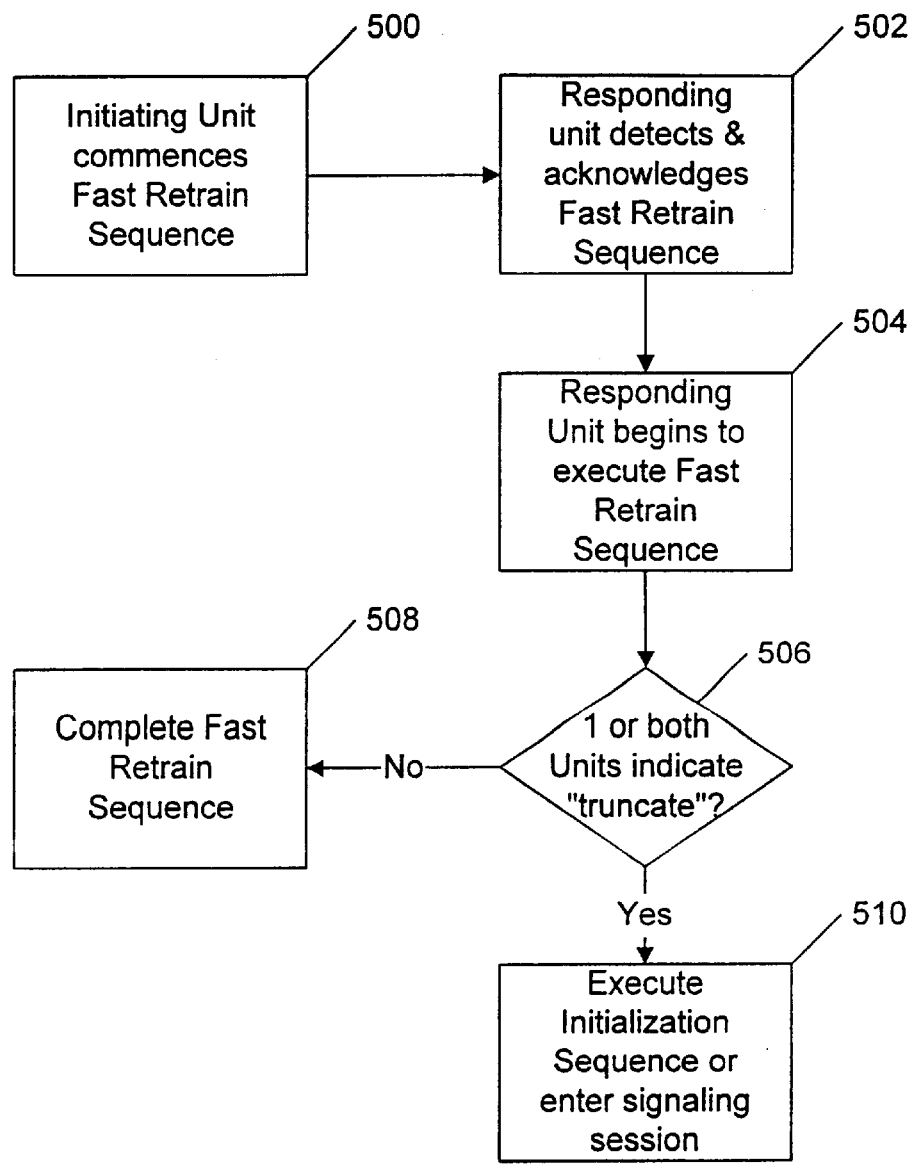
FIG. 5 is a flowchart showing a specific embodiment of the fast retrain sequence truncate embodiment of the invention.

FIG. 5 is a flowchart showing a specific embodiment of the invention for truncating a fast retraining sequence in a digital modem communication system. An initiating transceiver, unit (either an ATU-C or an ATU-R) commences transmission of a fast retrain sequence to a responding transceiver unit (STEP 500). The responding transceiver unit detects and acknowledges the commencement of the fast retrain sequence (STEP 502). The responding transceiver unit then begins execution of the fast retrain sequence (channel measurement and power cut-back level measurement) (STEP 504). At the end of the power cut-back section of the fast retrain sequence, if neither transceiver unit determines that it should truncate the fast retrain sequence (STEP 506), then the fast retrain sequence proceeds to completion (STEP 508). However, if either transceiver unit determines that it should truncate the fast retrain sequence (STEP 506), then initialization proceeds in conventional fashion or a signaling session (e.g., G.hs) is entered (STEP 510).

For example, for the embodiment illustrated above, the decision at STEP 506 may proceed as follows:

(1) If an ATU-R transceiver unit determines it wishes to truncate a fast retrain sequence, then it would set bit d5 in the R-MSG-FR1 message, otherwise, the ATU-R transceiver unit would not set bit d5. In either case, the ATU-R would proceed further with the fast retrain.

(2) If an ATU-C transceiver unit determines it wishes to truncate a fast retrain sequence, then it would set bit b5 in the C-MSG-FR1 message, otherwise, the ATU-C transceiver would not set bit b5. If the ATU-C transceiver unit determines that either bit d5 (from the ATU-R transceiver unit) or bit b5 (from the ATU-C transceiver unit) was set, then the ATU-C transceiver unit "goes quiet" (i.e., truncates the fast retrain procedure) and proceeds to STEP 510.

(3) If the ATU-R transceiver unit determines that either bit d5 (from the ATU-R transceiver unit) or bit b5 (from the ATU-C transceiver unit) was set, then the ATU-R transceiver unit proceeds to STEP 510 (i.e., truncates the fast retrain procedure).

The invention includes an escape mechanism that in the abort embodiment is definable in terms of standard commands. The invention further includes an escape mechanism that in the truncate embodiment is easily implementable by defining one or more unused bits in an existing standard message as a flag to indicate a truncation operation by a remote terminal, and adding a new message to convey a similar flag value indicating a truncation operation by a central office terminal. The invention also makes pooling of stored profiles in the central office more attractive by reducing the time penalty for fast retrains.

The invention may be implemented in hardware or software, or a combination of both. However, preferably, the invention is implemented in a conventional digital modem by means of a computer program executing on one or more programmable systems each comprising at least one processor, a data storage system (including volatile and non-volatile memory and/or storage elements), at least one input device, and at least one output device. Program code is applied to input data to perform the functions described herein and generate output information. The output information is applied to one or more output devices, in known fashion. The processor may be, for example, a digital signal processor (DSP).

Each such program may be implemented in any desired computer language (including machine, assembly, high level procedural, or object oriented programmable languages) to communicate with a computer system. In any case, the language may be a compiled or interpreted language.

Each such computer program is preferably stored on a storage media or device (e.g., ROM or magnetic media) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. A method for escaping from a fast retrain sequence in a digital modem communication system, including:
   (a) detecting commencement of the fast retrain sequence;
   (b) determining that fast retraining is unnecessary;
   (c) generating, in response to such determining, a signal sufficient to escape from the fast retrain sequence; and
   (d) commencing an initialization training sequence after generating the signal sufficient to escape from the fast retrain sequence.

2. The method of claim 1, further including determining that fast retraining is unnecessary by determining that no stored profiles corresponding to an initiating transceiver unit are stored in a responding transceiver unit.

3. The method of claim 1, further including determining that fast retraining is unnecessary by determining that a responding transceiver unit is changing data transmission modes.

4. The method of claim 1, further including determining that fast retraining is unnecessary by determining that a responding transceiver unit is changing data transmission mode parameters.

5. The method of claim 1, further including determining that fast retraining is unnecessary by determining that insufficient information exists to return directly to a data transmission state at completion of the fast retraining.

6. The method of claim 1, wherein the digital modem communication system is a digital subscriber line communication system.

7. The method of claim 6, further including indicating commencement of the fast retrain sequence by receiving a fast retrain request signal in a responding transceiver unit from an initiating transceiver unit.

8. The method of claim 7, wherein the fast retrain request signal is one of a R-RECOV command or a C-RECOV command.

9. The method of claim 6, wherein replying to the fast retrain sequence includes transmitting a special signal from a responding transceiver unit to an initiating transceiver unit other than an expected reply signal for the fast retrain sequence.

10. The method of claim 9, wherein the special signal is one of a C-ACT1 command, a C-ACT2 command, a C-ACT3 command, or a C-ACT4 command.

11. The method of claim 9, wherein the special signal is a G.hs signal.

12. A method for aborting a fast retrain sequence in a digital modem communication system, including:
    (a) detecting, in a responding transceiver unit, commencement of the fast retrain sequence from an initiating transceiver unit;
    (b) generating a signal sufficient to cause the initiating transceiver unit to abort the fast retrain sequence in response to such detection;
    (c) replying to the fast retrain sequence from the responding transceiver unit with the signal sufficient to cause the initiating transceiver unit to abort the fast retrain sequence; and
    (d) commencing an initialization training sequence after generating the signal sufficient to cause the initiating transceiver unit to abort the fast retrain sequence.

13. The method of claim 12, wherein replying to the fast retrain sequence includes transmitting a special signal from the responding transceiver unit to the initiating transceiver unit other than an expected reply signal for the fast retrain sequence.

14. A computer program, residing on a computer readable medium, for escaping from a fast retrain sequence in a digital modem communication system, the computer program comprising instructions for causing the computer to:
    (a) detect commencement of the fast retrain sequence;
    (b) determine that fast retraining is unnecessary;
    (c) generate, in response to such determination, a signal sufficient to escape from the fast retrain sequence; and
    (d) commence an initialization training sequence after generation of the signal sufficient to escape from the fast retrain sequence.

15. The computer program of claim 14, further including instructions for causing the computer to determine that fast retraining is unnecessary by determining that no stored profiles corresponding to an initiating transceiver unit are stored in a responding transceiver unit.

16. The computer program of claim 14, further including instructions for causing the computer to determine that fast retraining is unnecessary by determining that a responding transceiver unit is changing data transmission modes.

17. The computer program of claim 14, further including instructions for causing the computer to determine that fast retraining is unnecessary by determining that a responding transceiver unit is changing data transmission mode parameters.

18. The computer program of claim 14, further including instructions for causing the computer to determine that fast retraining is unnecessary by determining that insufficient information exists to return directly to a data transmission state at completion of the fast retraining.

19. The computer program of claim 14, wherein the digital modem communication system is a digital subscriber line communication system.

20. The computer program of claim 19 further including instructions for causing the computer to indicate commencement of the fast retrain sequence by receiving a fast retrain request signal in a responding transceiver unit from an initiating transceiver unit.

21. The computer program of claim 20, wherein the fast retrain request signal is one of a R-RECOV command or a C-RECOV command.

22. The computer program of claim 14, wherein the instructions for causing the computer to reply to the fast retrain sequence includes instructions for causing a computer to transmit a special signal from a responding transceiver unit to an initiating transceiver unit other than an expected reply signal for the fast retrain sequence.

23. The computer program of claim 22, wherein the special signal is one of a C-ACT1 command, a C-ACT2 command, a C-ACT3 command, or a C-ACT4 command.

24. The computer program of claim 22, wherein the special signal is a G.hs signal.

25. A computer program, residing on a computer readable medium, for aborting a fast retrain sequence in a digital modem communication, the computer program comprising instructions for causing the computer to:
  (a) detect, in a responding transceiver unit, commencement of the fast retrain sequence from an initiating transceiver unit;
  (b) generate a signal sufficient to cause the initiating transceiver unit to abort the fast retrain sequence in response to such detection;
  (c) reply to the fast retrain sequence from the responding transceiver unit in response to such detection with the signal sufficient to cause the initiating transceiver unit to abort the fast retrain sequence; and
  (d) commence an initialization training sequence after generation of the signal sufficient to cause the initiating transceiver to abort the fast retrain sequence.

26. The computer program of claim 25, wherein the instructions for causing the computer to reply to the fast retrain sequence includes instructions for causing the computer to transmit a special signal from the responding transceiver unit to the initiating transceiver unit other than an expected reply signal for the fast retrain sequence.

* * * * *

UNITED STATES PATENT AND TRADEMARK OFFICE
CERTIFICATE OF CORRECTION

PATENT NO.   : 6,252,901 B1  Page 1 of 1
DATED        : June 26, 2001
INVENTOR(S)  : A. Joseph Mueller and Richard G.C. Williams It is certified that error appears in the above-identified patent and that said Letters Patent is hereby corrected as shown below:

<u>Title page,</u>
Item [56], please delete "5,852,630 12/1999 Langberg et al." and substitute
-- 5,852,630 12/1998 Langberg et al. --.

<u>Column 3,</u>
Line 10, delete "require" and replace with -- reacquire --.
Line 14, delete "timing," and replace with -- timing --.
Line 53, delete "unnecessary" and replace with -- unneccessary, --.

<u>Column 4,</u>
Line 11, delete "dioital" and replace with -- digital --.
Line 19, delete "trunicatining" and replace with -- truncating --.
Line 21, delete "systems" and replace with -- system, --.
Line 63, delete "system" and replace with -- system, --.

<u>Column 6,</u>
Line 46, delete "Iransceiver" and replace with -- Transceiver --.

<u>Column 8,</u>
Line 39, delete "transceiver," and replace with -- transceiver --.

Signed and Sealed this

Twenty-second Day of October, 2002

Attest:

Attesting Officer

JAMES E. ROGAN
Director of the United States Patent and Trademark Office